United States Patent
Stephens

(10) Patent No.: US 7,400,599 B2
(45) Date of Patent: Jul. 15, 2008

(54) METHOD AND APPARATUS TO CONTROL TRAINING FOR REVERSE DIRECTION DATA IN A HIGH THROUGHPUT WIRELESS NETWORK

(75) Inventor: Adrian P. Stephens, Cottenham (GB)

(73) Assignee: Intel Corporation, Santa Clara, CA (US)

( * ) Notice: Subject to any disclaimer, the term of this patent is extended or adjusted under 35 U.S.C. 154(b) by 766 days.

(21) Appl. No.: 10/876,015

(22) Filed: Jun. 24, 2004

(65) Prior Publication Data

US 2005/0286445 A1    Dec. 29, 2005

(51) Int. Cl.
*H04Q 7/00* (2006.01)
(52) U.S. Cl. ...................................... 370/329
(58) Field of Classification Search ................. 370/252, 370/342, 335, 350, 441, 491, 503, 507, 524; 375/147

See application file for complete search history.

(56) References Cited

U.S. PATENT DOCUMENTS

| 6,724,815 | B1 | 4/2004 | Jepsen et al. | |
| 7,042,928 | B2 * | 5/2006 | Abrishamkar et al. | 375/147 |
| 2001/0012775 | A1 * | 8/2001 | Modzelesky et al. | 455/427 |
| 2002/0159537 | A1 * | 10/2002 | Crilly, Jr. | 375/267 |
| 2005/0018624 | A1 * | 1/2005 | Meier et al. | 370/318 |

FOREIGN PATENT DOCUMENTS

WO    WO-0213448 A2    2/2002

* cited by examiner

*Primary Examiner*—Seema S. Rao
*Assistant Examiner*—Wanda Z Russell
(74) *Attorney, Agent, or Firm*—The Law Office John C. Scott, LLC; John C. Scott

(57) ABSTRACT

In a high throughput wireless network, data is permitted to be transmitted in a reverse direction during a frame exchange (i.e., from a responder to an initiator). In at least one embodiment, channel training is performed in the reverse direction only if it is determined that a performance benefit may result.

19 Claims, 4 Drawing Sheets

METHOD AND APPARATUS TO CONTROL TRAINING FOR REVERSE DIRECTION DATA IN A HIGH THROUGHPUT WIRELESS NETWORK

TECHNICAL FIELD

The invention relates generally to wireless communications and, more particularly, to wireless networking.

BACKGROUND OF THE INVENTION

There is currently a demand for higher network throughput in the wireless networking industry. Many strategies are being considered for increasing aggregate network throughput in a wireless network in an efficient manner. In one potential throughput-enhancing strategy, data transmission in the reverse direction may be permitted during a frame exchange in a wireless network. By allowing reverse direction data transmission within a frame exchange, a future frame exchange (that otherwise would have been required to carry the reverse data) may become unnecessary. Some or all of the bandwidth that would have been consumed by this future frame exchange would then be available for other communication activity, thus increasing the overall throughput of the network. There is a general need for techniques and structures for efficiently implementing reverse direction data transmission in a wireless network.

DETAILED DESCRIPTION

Figure 1:
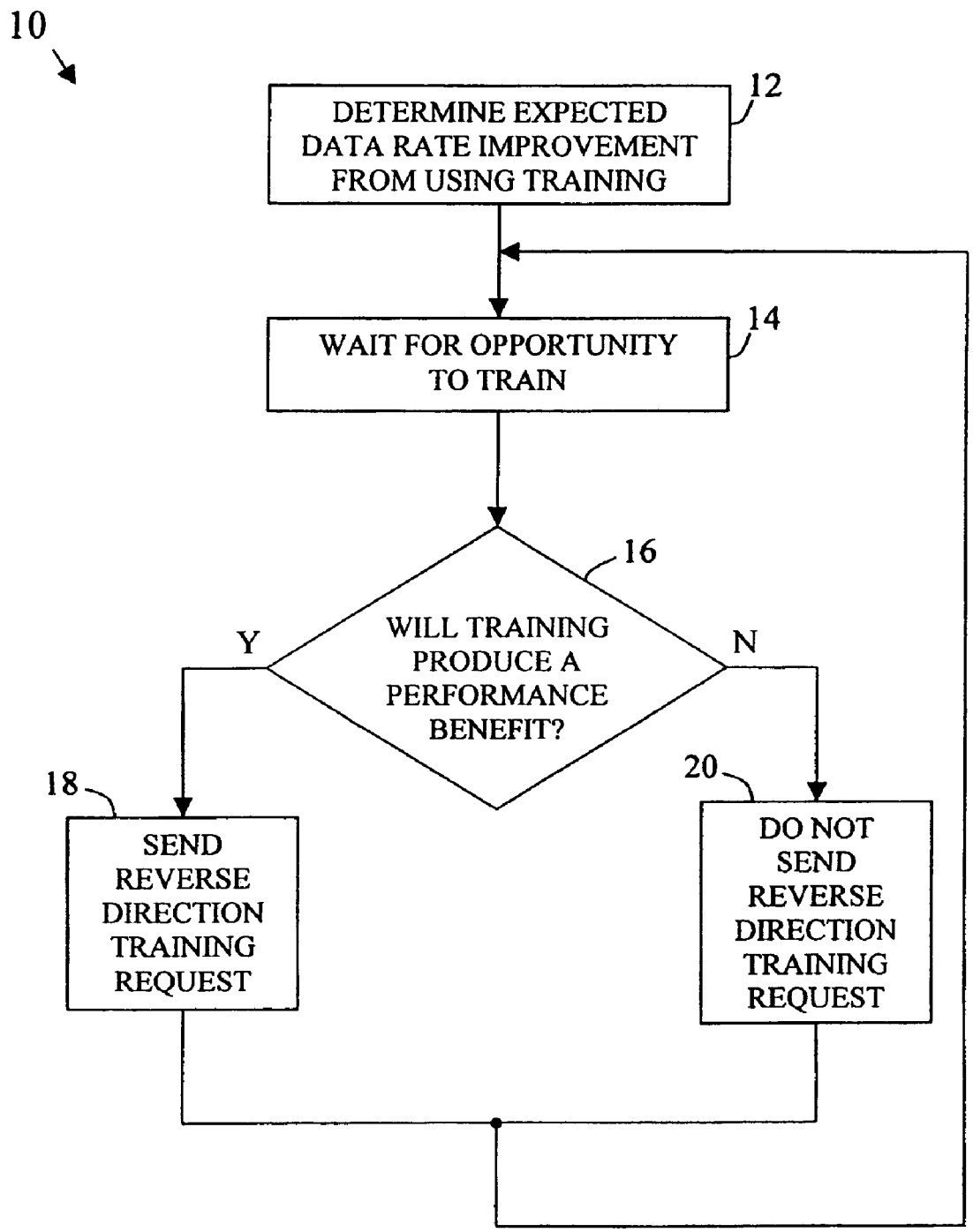
FIG. 1 is a flowchart illustrating an example method for determining whether to request reverse direction channel training in a wireless network in accordance with an embodiment of the present invention.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

In a wireless network that allows reverse direction data transmission during a frame exchange, a question arises as to whether or not to use channel training for the reverse direction transmission. In conceiving the present invention, it was appreciated that, in some cases, the use of channel training for reverse direction data transmission can result in a clear performance benefit in a network and, in other cases, channel training may simply result in a waste of resources as the training process may itself carry an overhead. Thus, in at least one aspect of the present invention, techniques and structures are provided for dynamically determining whether to perform reverse direction channel training in a wireless network based on an estimation of whether or not a performance benefit will be achieved.

FIG. 1 is a flowchart illustrating an example method 10 for use in determining whether to request reverse direction channel training in a wireless network in accordance with an embodiment of the present invention. As used herein, the term "initiator" is intended to identify a wireless device that initiates a wireless frame exchange and the term "responder" is intended to identify a wireless device that responds to the wireless frame exchange. Thus, a reverse direction data transmission is made from a responder to a corresponding initiator. In at least one embodiment of the invention, the method 10 of FIG. 1 will be performed in connection with a responder to determine whether or not to send a training request frame to an initiator to request the transmission of training data to the responder.

With reference to FIG. 1, an expected data rate improvement that may be achieved by using channel training for reverse direction data transmission is first determined (block 12). The expected data rate improvement may be determined in a number of different ways. In one approach, for example, the data rate improvement may be determined using whatever adaptation mechanism is available to select transmit rates in the network. Using the adaptation mechanism, adapted transmit rates may be determined both with and without the use of training. A data rate ratio or percentage may then be generated as the improvement figure (although this is not necessary). In another possible approach, a fixed improvement factor may be used. That is, an improvement factor may be determined beforehand and fixed for the life of a device (e.g., for singular value decomposition (SVD) multiple input-multiple output (MIMO) type training, a fixed value of 30% rate improvement might be used, etc.). Other techniques for determining rate improvement may alternatively be used.

A device may next wait for an opportunity to request reverse direction training (block 14). For a responder device, this opportunity may occur after an initial transmission is received from an initiator at the beginning of a frame exchange. That is, the responder will have an opportunity to request training within its response to the initial transmission. When an opportunity to request training has been detected, the responder may then determine whether reverse direction training will produce a performance benefit in the network (block 16). If it is determined that training will produce a performance benefit, the responder may decide that training should be performed and send a training request to the initiator in its response frame (block 18). If it is determined that training will not produce a performance benefit, on the other hand, the responder may decide that training should be not be performed and not send a training request to the initiator in its response frame (block 20). The responder may then wait for a subsequent opportunity to request training (block 14) and repeat the above described process.

Figure 2:
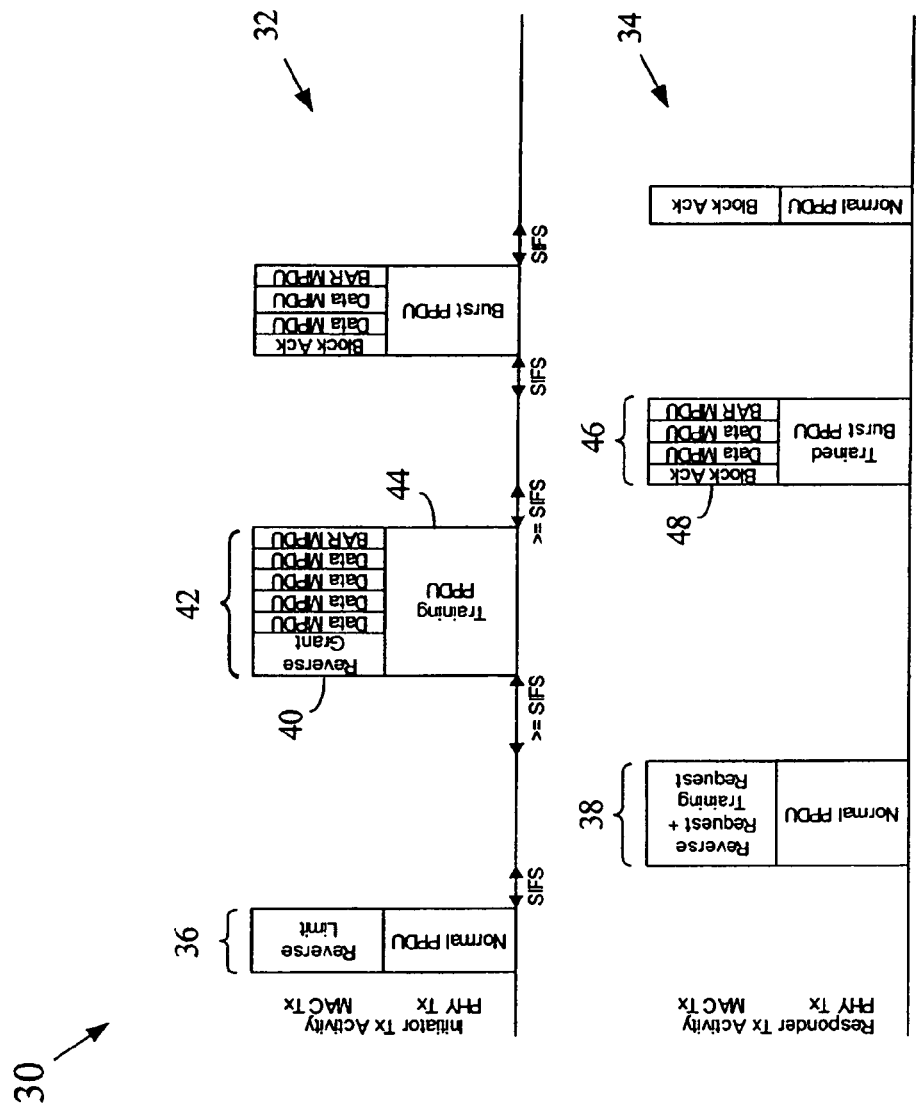
FIG. 2 is a timing diagram illustrating an example frame exchange that may occur within a wireless network in accordance with an embodiment of the present invention.

FIG. 2 is a timing diagram illustrating an example frame exchange 30 that may occur within a wireless network in accordance with an embodiment of the present invention. The upper portion 32 of the diagram illustrates the transmit activity of the initiator and the lower portion 34 of the diagram illustrates the transmit activity of the responder. As shown, the transmissions of the initiator and the responder are represented on both the physical layer (PHY Tx) and the media access control layer (MAC Tx) in the diagram. The frame exchange 30 starts when the initiator transmits an initial frame 36. Among other things, the initial frame 36 may include an indication of the maximum amount of time (i.e., the reverse limit) that will be permitted for the delivery of reverse direction data from a responder during the frame exchange 30. In at least one embodiment of the invention, as will be described in greater detail, the responder may use this reverse limit information to determine whether reverse direction channel training will produce a performance benefit in the network. The reverse limit information may be located anywhere within the initial frame 36.

With reference to FIG. 2, after the responder receives the initial frame 36 from the initiator, the responder must determine whether it desires to transmit data in the reverse direction back to the initiator and, if so, whether it desires reverse direction channel training to be performed. The responder may determine whether it desires to transmit data in the reverse direction based on whether or not data is presently buffered in the responder for delivery to the initiator. If the responder determines that it does wish to transmit data in the reverse direction, it includes a reverse direction data request in the response frame 38 that is transmitted back to the initiator. The responder may determine whether to request reverse direction training using, for example, method 10 of FIG. 1. If the responder decides to request reverse direction channel training, it includes a training request within the response frame 38. In at least one embodiment, the training request may identify a type of training being requested (e.g., SVD MIMO training, etc.).

When the initiator receives a response frame 38 having a reverse direction data request, it must decide whether or not to allow the reverse direction data transmission. If the initiator decides to allow the reverse direction data transmission, it may transmit a reverse grant indication 40 to the responder within that MAC layer of a subsequent frame 42. As shown, the frame 42 may also include, for example, a number of data management protocol data units (MPDUs) and a block acknowledgement request MPDU within the MAC layer. If the response frame 38 includes a reverse direction training request, then the initiator may transmit training data to the responder within, for example, a training PLCP protocol data unit (PPDU) 44 of frame 42. The responder may then use the training data to perform channel training and transmit data to the initiator in its next frame 46. The responder reads the BAR MPDU within the transmitted frame 42 and, in response thereto, transmits a block acknowledge (ACK) 48 at the beginning of the frame 46. The responder may then transmit data MPDUs that include the data to be delivered to the initiator.

Figure 3:
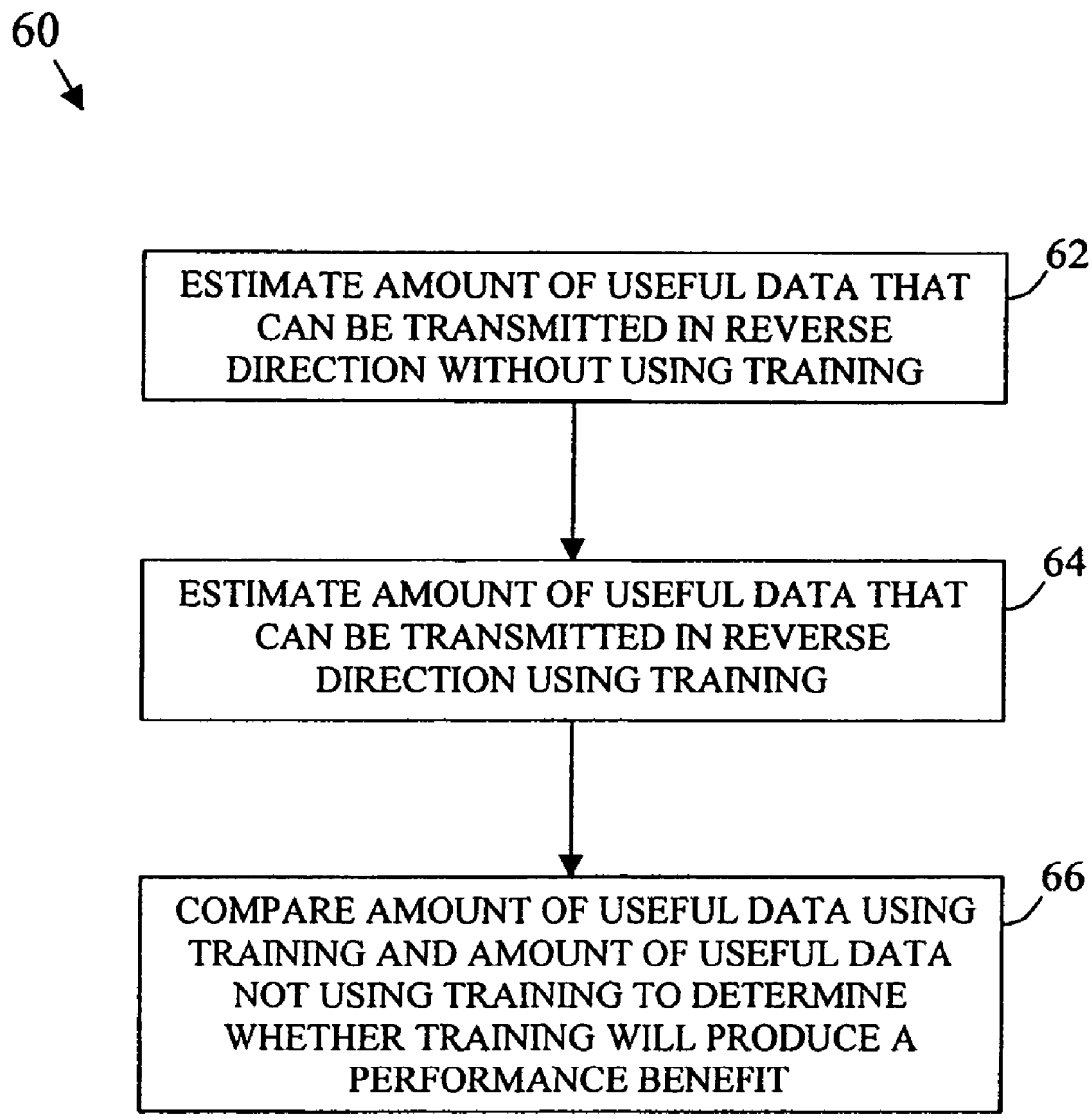
FIG. 3 is a flowchart illustrating an example method for use in determining whether reverse direction training during a frame exchange will produce a performance benefit in a wireless network in accordance with an embodiment of the present invention.

FIG. 3 is a flowchart illustrating an example method 60 for use in determining whether reverse direction training will produce a performance benefit in a wireless network during a frame exchange in accordance with an embodiment of the present invention. The method 60 may be used, for example, within the method 10 of FIG. 1 and/or in other training-related methods. With reference to FIG. 3, an amount of useful data that can be transmitted from a responder to an initiator during a frame exchange without using reverse channel training is estimated (block 62). The term "useful data" is used herein to distinguish the overall amount of data that will be transmitted (which can include, for example, overhead data, etc.) from the data that will actually be useable by the initiator. An amount of useful data that can be transmitted from the responder to the initiator during the frame exchange using reverse channel training is also estimated (block 64). The amount of useful data using training and the amount of useful data not using training are then compared to one another to determine whether training will produce a performance benefit (block 66). In one possible approach, the amount of useful data that may be transmitted using training must exceed the amount of useful data that may be transmitted when not using training by more than a threshold amount before a performance benefit will be found (where the threshold amount can be greater than or equal to zero). Thus, if the amount of useful data that can be transmitted while using training is lower than the amount while not using training, or if the two amounts of useful data are equal, or if the amount of useful data that can be transmitted while using training is greater than the amount while not using training by less than the threshold amount, then no performance benefit is derived from using channel training. Other techniques for performing the comparison may alternatively be used.

As described above in connection with FIG. 2, a reverse limit value may be included within the initial frame transmitted by an initiator in a wireless network that indicates the maximum amount of time that will be allowed for reverse direction data transmission from a responder. In at least one embodiment of the present invention, this reverse limit value may be used to estimate the amounts of useful data that may be transmitted with and without training during a frame exchange and, ultimately, whether training will be requested at all during the frame exchange. In one approach, the amount of useful data that can be transmitted during the frame exchange without using training may be estimated as follows:

$$\text{useful data (w/o training)} = \min \begin{cases} \text{rate (w/o training)} \times \text{reverse limit} \\ \text{amount of data buffered for initiator} \end{cases}$$

Thus, the amount of useful data will be the lesser of: (a) the amount of data that may be transmitted within the reverse time limit at the data rate determined previously for no training and (b) the amount of data that is currently buffered within the responder for delivery to the initiator. In a similar fashion, the amount of useful data that can be transmitted using training may be estimated as follows:

$$\text{useful data (w/ training)} = \min \begin{cases} [\text{rate (w/ training)} \times \text{reverse limit}] - \\ \text{training overhead} \\ \text{amount of data buffered for initiator} \end{cases}$$

In this estimate, the data rate using training is first multiplied by the reverse limit and the overhead required by the training process is then subtracted from the product. The lesser of this result and the amount of data that is currently buffered within the responder for delivery to the initiator is then selected as the useful data estimate using training. As described previously, the data rate using training may be calculated by multiplying the data rate without training by the improvement factor determined previously. Other techniques for estimating useful data with and without training may alternatively be used.

As described above, in at least one approach, the reverse limit value is included within the initial frame transmitted by the initiator. Other sources of this information may alternatively be used. For example, in one alternative approach, a constant reverse limit value may be used that will be known beforehand within the responders.

Figure 4:
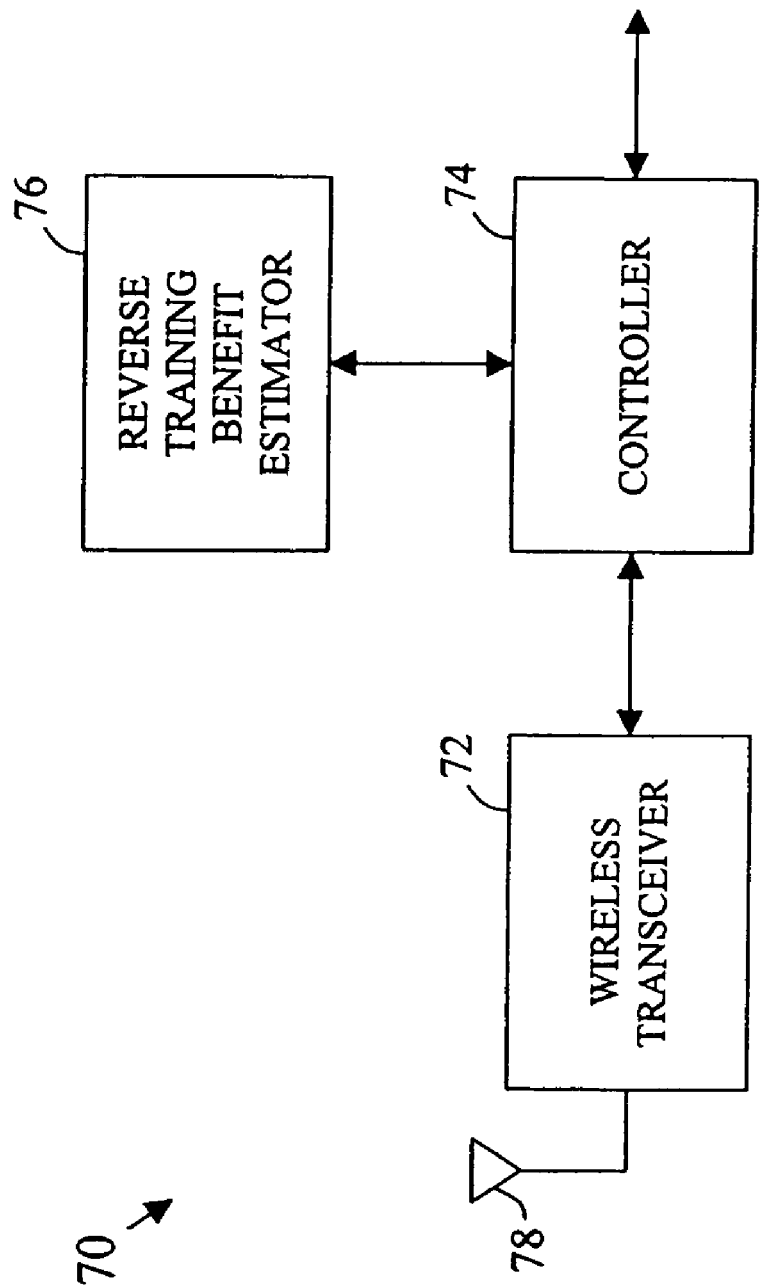
FIG. 4 is a block diagram illustrating an example wireless device in accordance with an embodiment of the present invention.

FIG. 4 is a block diagram illustrating an example wireless device 70 in accordance with an embodiment of the present invention. As will be described in greater detail, the wireless device 70 is capable of acting as a responder in a high throughput wireless network. As illustrated, the wireless device 70 may include: a wireless transceiver 72, a controller 74, and a reverse training benefit estimator 76. The wireless transceiver 72 is operative for supporting wireless communication with one or more remote wireless entities. The wireless transceiver 72 may be coupled to, for example, one or more antennas 78 to facilitate the transmission and reception of wireless signals. Any type of antenna(s) 78 may be used including, for example, a dipole, a patch, a helical antenna, an antenna array, and/or others, including combinations of the above.

The controller 74 is operative for controlling, among other things, reverse direction data transmission and training for the wireless device 70. The reverse training benefit estimator 76 is operative for estimating, when an opportunity to request reverse direction training arrives, whether a performance benefit will result from the use of reverse direction training during a frame exchange. When an initial frame is received from an initiator by the wireless transceiver 72, the controller 74 may determine whether it desires to transmit data in the reverse direction. If so, the controller 74 may call upon the reverse training benefit estimator 76 for a determination as to whether reverse training will produce a performance benefit. If the reverse training benefit estimator 76 indicates that a benefit will be achieved, the controller may then send a reverse training request back to the initiator as part of a response frame. In at least one implementation, the reverse training benefit estimator 76 may use the method 60 of FIG. 3 to make its determination.

The wireless device 70 may comprise any type of device that is capable of communicating in a wireless network including, for example, a laptop, desktop, palmtop, or tablet computer having wireless networking capability, a personal digital assistant (PDA) having wireless networking capability, a cellular telephone or other handheld wireless communicator, a pager, a wireless computer peripheral, a wireless access point, and/or others. In at least one implementation, the wireless transceiver 72, the controller 74, and the reverse training benefit estimator 76 may be part of a wireless network interface card or other wireless network interface module.

In at least one embodiment of the invention, multiple responders will be able to respond to a single frame transmitted by an initiator. In such an embodiment, each of the responders may make a separate determination as to whether reverse direction training will be requested using the above described techniques.

In the description above, terminology is used that is related to the IEEE 802.11 wireless networking standard (and its progeny). It should be appreciated, however, that the inventive principles also have application in wireless networks and systems following other wireless standards.

It should be appreciated that the individual blocks illustrated in the block diagrams herein may be functional in nature and do not necessarily correspond to discrete hardware elements. For example, in the block diagram of FIG. 4, two or more of the blocks (e.g., controller 74 and reverse training benefit estimator 76) may be implemented in software within a single (or multiple) digital processing device(s). For example, the reverse training benefit estimator 76 may be a software module or subroutine that may be called upon by a controller program. In another possible approach, the controller 74 and the reverse training benefit estimator 76 may be implemented as part of a common program. Other techniques may alternatively be used. The digital processing device(s) may include, for example, a general purpose microprocessor, a digital signal processor (DSP), a reduced instruction set computer (RISC), a complex instruction set computer (CISC), a field programmable gate array (FPGA), an application specific integrated circuit (ASIC), and/or others, including combinations of the above. Hardware, software, firmware, and hybrid implementations may be used.

In the foregoing detailed description, various features of the invention are grouped together in one or more individual embodiments for the purpose of streamlining the disclosure. This method of disclosure is not to be interpreted as reflecting an intention that the claimed invention requires more features than are expressly recited in each claim. Rather, as the following claims reflect, inventive aspects may lie in less than all features of each disclosed embodiment.

Although the present invention has been described in conjunction with certain embodiments, it is to be understood that modifications and variations may be resorted to without departing from the spirit and scope of the invention as those skilled in the art readily understand. Such modifications and variations are considered to be within the purview and scope of the invention and the appended claims.

What is claimed is:

1. A method for managing channel training in a reverse direction in a wireless communication network, comprising:
   when an opportunity to request reverse direction channel training arises during a frame exchange between an initiator device and a responder device, determining, at the responder device, whether reverse direction channel training will produce a performance benefit wherein an initiator device is a device that initiates a wireless frame exchange, a responder device is a device that communicates with the initiator device during the wireless frame exchange, and the reverse direction is the direction from the responder device to the initiator device;
   sending a reverse direction channel training request from the responder device to the initiator device only when it is determined that training will produce a performance benefit; wherein determining whether reverse direction channel training will produce a performance benefit includes:
   estimating a first amount of useful data that can be transmitted in the reverse direction during the frame exchange without using reverse direction channel training;
   estimating a second amount of useful data that can be transmitted in the reverse direction during the frame exchange using reverse direction channel training; and
   comparing said first amount to said second amount.

2. The method of claim 1, wherein:

estimating a first amount of useful data includes:
- multiplying a data rate associated with not using reverse direction training by a transmit duration that is associated with reverse direction data to generate a product; and
- choosing a smaller of said product and an amount of buffered data waiting to be transmitted to the initiator device from the responder device.

3. The method of claim 1, wherein:

estimating a second amount of useful data includes:
- multiplying a data rate associated with using reverse direction training by a transmit duration that is associated with reverse direction data to generate a product;
- subtracting a training overhead quantity from said product to generate a difference; and
- choosing a smaller of said difference and an amount of buffered data waiting to be transmitted to the initiator device from the responder device.

4. The method of claim 1, wherein:

comparing said first amount to said second amount includes determining that reverse direction training will not produce a performance benefit when said second amount is less than or equal to said first amount.

5. An apparatus for use in a wireless network, comprising:
- a wireless transceiver;
- a controller to control data transmission and training during a wireless frame exchange;
- a reverse training benefit estimator to estimate, when said apparatus is being used as a responder device communicating with an initiator device, whether a performance benefit will be obtained by using reverse direction channel training wherein an initiator device is a device that initiates a wireless frame exchange, a responder device is a device that communicates with the initiator device during the wireless frame exchange, and said reverse direction is a direction from the responder device to the initiator device;
- wherein said controller causes a reverse direction training request to be transmitted to the initiator device when said reverse training benefit estimator indicates that a performance benefit will be obtained by using reverse training; and
- wherein said reverse training benefit estimator is programmed to: estimate a first amount of useful data that can be transmitted in the reverse direction during a frame exchange without reverse training, estimate a second amount of useful data that can be transmitted in the reverse direction during the frame exchange using reverse training, and determine whether a performance benefit will be achieved by comparing said first and second amounts.

6. The apparatus of claim 5, wherein:

said reverse training benefit estimator is programmed to estimate said first amount of useful data by determining an amount of buffered data that is buffered for delivery to an initiator, calculating a product of a reverse direction data rate not using training and a reverse direction time limit, and selecting the lower of said amount of buffered data and said product.

7. The apparatus of claim 5, wherein:

said reverse training benefit estimator is programmed to estimate said second amount of useful data by determining an amount of buffered data that is buffered for delivery to an initiator, calculating a product of a reverse direction data rate using training and a reverse direction time limit, subtracting a training overhead value from said product to generate a difference, and selecting the lower of said amount of buffered data and said difference.

8. The apparatus of claim 5, wherein:

said controller detects an opportunity to train when an initial frame is received from an initiator at the beginning of a frame exchange.

9. The apparatus of claim 8, wherein:

said initial frame includes said reverse direction time limit and said controller is programmed to read said reverse direction time limit from said initial frame and deliver it to said reverse training benefit estimator.

10. The apparatus of claim 5, wherein:

said apparatus is a wireless network interface module.

11. A method comprising:
- receiving an initial frame from an initiator that begins a wireless frame exchange;
- reading a reverse limit value from said initial frame;
- estimating, based on said reverse limit value, a first amount of useful data that can be transmitted in a reverse direction back to said initiator without using channel training;
- estimating, based on said reverse limit value, a second amount of useful data that can be transmitted in a reverse direction back to said initiator using channel training; and
- determining whether to request reverse direction training based on a comparison of said first and second amounts of useful data.

12. The method of claim 11, wherein:

estimating a first amount of useful data includes:
- multiplying a data rate associated with not using reverse direction training by said reverse limit value to generate a product; and
- choosing the smaller of said product and an amount of buffered data waiting to be transmitted to an initiator.

13. The method of claim 11, wherein:

estimating a second amount of useful data includes:
- multiplying a data rate associated with using reverse direction training by said reverse limit value to generate a product;
- subtracting a training overhead quantity from said product to generate a difference; and
- choosing the smaller of said difference and an amount of buffered data waiting to be transmitted to an initiator.

14. A wireless device, comprising:
- at least one dipole antenna;
- a wireless transceiver coupled to said at least one dipole antenna;
- a controller to control data transmission and training during a wireless frame exchange;
- a reverse training benefit estimator to estimate, when said wireless device is being used as a responder device communicating with an initiator device, whether a performance benefit will be obtained by using reverse direction channel training wherein an initiator device is a device that initiates a wireless frame exchange, a responder device is a device that communicates with the initiator device during the wireless frame exchange, and said reverse direction is a direction from the responder device to the initiator device;
- wherein said controller causes a reverse direction training request to be transmitted to the initiator device when said reverse training benefit estimator indicates that a performance benefit will be obtained by using reverse training; and wherein said reverse training benefit estimator is programmed to: estimate a first amount of useful data that can be transmitted in the reverse direction during a frame exchange without reverse training, estimate a second amount of useful data that can be transmitted in the reverse direction during the frame exchange using reverse training, and determine whether a performance benefit will be achieved by comparing said first and second amounts.

15. The apparatus of claim 14, wherein:
said reverse training benefit estimator is programmed to estimate said first amount of useful data by determining an amount of buffered data that is buffered for delivery to an initiator, calculating a product of a reverse direction data rate not using training and a reverse direction time limit, and selecting the lower of said amount of buffered data and said product.

16. The apparatus of claim 14, wherein:
said reverse training benefit estimator is programmed to estimate said second amount of useful data by determining an amount of buffered data that is buffered for delivery to an initiator, calculating a product of a reverse direction data rate using training and a reverse direction time limit, subtracting a training overhead value from said product to generate a difference, and selecting the lower of said amount of buffered data and said difference.

17. An article comprising a computer readable storage medium having instructions stored thereon that, when executed by a computing platform, operate to:
when an opportunity to request reverse direction channel training arises during a frame exchange between an initiator device and a responder device, determine, at the responder device, whether reverse direction channel training will produce a performance benefit, wherein an initiator device is a device that initiates a wireless frame exchange, a responder device is a device that communicates With the initiator device during the wireless frame exchange, and the reverse direction is the direction from the responder device to the initiator device;
send a reverse direction channel training request from the responder device to the initiator device only when it is determined that training will produce a performance benefit;
wherein operation to determine whether reverse direction training will produce a performance benefit, includes operation to:
estimate a first amount of useful data that can be transmitted in the reverse direction during the wireless frame exchange without using reverse direction training;
estimate a second amount of useful data that can be transmitted in the reverse direction during the wireless frame exchange using reverse direction training; and
compare said first amount to said second amount.

18. The article of claim 17, wherein:
operation to estimate said first amount of useful data, includes operation to:
multiply a data rate associated with not using reverse direction training by a transmit duration that is associated with reverse direction data to generate a product; and
choose a smaller of said product and an amount of buffered data waiting to be transmitted to the initiator device from the responder device.

19. The article of claim 17, wherein:
operation to estimate said second amount of useful data, includes operation to:
multiply a data rate associated with using reverse direction training by a transmit duration that is associated with reverse direction data to generate a product;
subtract a training overhead quantity from said product to generate a difference; and
choose a smaller of said difference and an amount of buffered data waiting to be transmitted to the initiator device from the responder device.

* * * * *